(12) United States Patent
Li

(10) Patent No.: US 8,266,426 B2
(45) Date of Patent: Sep. 11, 2012

(54) HARDWARE CERTIFICATION BASED ON CERTIFYING DEVELOPMENT PROCESSES

(75) Inventor: Richard Ding Li, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1011 days.

(21) Appl. No.: 11/387,704

(22) Filed: Mar. 24, 2006

(65) Prior Publication Data

US 2007/0226487 A1    Sep. 27, 2007

(51) Int. Cl.
*H04L 29/00* (2006.01)
(52) U.S. Cl. .................. 713/158; 713/156; 713/157
(58) Field of Classification Search .............. 713/158, 713/156–157
See application file for complete search history.

(56) References Cited

U.S. PATENT DOCUMENTS

| | | | | |
|---|---|---|---|---|
| 5,947,747 | A * | 9/1999 | Walker et al. | 434/354 |
| 6,934,028 | B2 * | 8/2005 | Ho et al. | 356/430 |
| 7,020,573 | B2 * | 3/2006 | Wheeler et al. | 702/121 |
| 7,500,267 | B2 * | 3/2009 | McKune et al. | 726/26 |
| 2003/0110415 | A1 * | 6/2003 | Podgorsky et al. | 714/36 |
| 2003/0144967 | A1 * | 7/2003 | Zubeldia et al. | 705/73 |
| 2003/0182180 | A1 * | 9/2003 | Zarrow | 705/11 |
| 2004/0044939 | A1 * | 3/2004 | Lea et al. | 714/746 |
| 2005/0131583 | A1 * | 6/2005 | Ransom | 700/295 |
| 2005/0222815 | A1 * | 10/2005 | Tolly | 702/185 |
| 2005/0272419 | A1 * | 12/2005 | Matsuo et al. | 455/423 |
| 2007/0113066 | A1 * | 5/2007 | Samba et al. | 713/1 |

* cited by examiner

*Primary Examiner* — David Garcia Cervetti
*Assistant Examiner* — Ghazal Shehni
(74) *Attorney, Agent, or Firm* — Lowenstein Sandler PC

(57) ABSTRACT

Embodiments of the present invention provide methods and systems for certifying components based on certification of the development and testing processes of the components. As noted above, traditional certification relies on the certification service or agent to specify the exact details of the development and testing processes performed on a component. In contrast, embodiments of the present invention rely on determining a standard required that should be satisfied by the processes performed on the component and certifying those processes that meet this standard. Hence, detailed specification of the individual actions performed in certified processes is unnecessary. This allows the various entities that develop or test (i.e., produce) a component to flexibly determine their own processes.

19 Claims, 3 Drawing Sheets

HARDWARE CERTIFICATION BASED ON CERTIFYING DEVELOPMENT PROCESSES

FIELD OF THE INVENTION

The present invention relates to the certification of components. More particularly, the present invention relates to methods and systems for certifying processes used to develop or test components.

BACKGROUND OF THE INVENTION

In the computer industry, customers would like to know which components of hardware, firmware, software, etc. will work well together. Accordingly, most vendors test and certify the compatibility of their products. For example, independent software vendors (ISVs) and independent hardware vendors (IHVs) will certify which of their specific products ate compatible with a particular version of an operating system or version of software. Typically, the certification process involves running a suite of tests on one or more computer systems that include the product to be certified.

Typically, hardware vendors (particularly major hardware vendors such as Hewlett Packard, EMC, Dell, IBM, etc.) perform extensive testing of their hardware before production. In order to obtain a certification, most vendors are provided a specific test suite from a certifying body. For example, a software provider, such as Microsoft, typically administers a significant hardware certification program for its vendors. In order to obtain certification status with Microsoft and its products, a hardware vendor must utilize the test suite provided from Microsoft. Other organizations, such as Sun Microsystems, and Novell, have similar programs that specify a test suite for certification.

Unfortunately, the running of these tests is time consuming and labor intensive, and often is redundant existing testing processes of other vendors, such as the ISV that sells software for a component of hardware. In addition, it is very difficult to maintain and apply the complicated test suites provided by certifying agents, such as Microsoft, and the like.

Accordingly, it would be desirable to streamline and simplify the certification and testing process required from the various hardware vendors. In addition, it would be desirable to enable fast certification of hardware without compromising quality.

SUMMARY OF THE INVENTION

In accordance with one aspect of the present invention, a method of certifying a component of hardware by a certification service is provided. An entity that produced the component of hardware is identified. It is then determined whether the identified entity has acknowledged compliance to a set of requirements provided from the certification service for processes performed by the identified entity. The component of hardware is automatically certified based on the acknowledged compliance.

In accordance with another aspect of the present invention, a method of certifying a component of hardware by a certification service is provided. A set of checklists is provided to entities that provide the component of hardware. An acknowledgment to comply with the set of checklists is obtained from the entities. The components of hardware that are provided from entities that have acknowledged compliance with the set of checklists are then automatically certified.

In accordance with another feature of the present invention, a method of certifying processes performed on a component of hardware is provided. Information is received that describes the processes performed by entities that produce the component of hardware. A set of requirements that are common to at least some of the processes performed by the entities is determined. This set of requirements is then provided to the entities and the processes of entities that acknowledge compliance to the set of requirements are certified.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the present invention provide methods and systems for certifying components based on certification of the development and testing processes of the components. As noted above, traditional certification relies on the certification service or agent to specify the exact details of the development and testing processes performed on a component. In contrast, embodiments of the present invention rely on determining a standard required that should be satisfied by the processes performed on the component and certifying those processes that meet this standard. Hence, detailed specification of the individual actions performed in certified processes is unnecessary. This allows the various entities that develop or test (i.e., produce) a component to flexibly determine their own processes.

In one embodiment, a certification service may provide one or more checklists to entities that develop or test a component. The checklist may provide various requirements and different checklists may exist for different categories of components. Once a process has been certified, the components produced from that process can automatically be certified by the certification service. Processes by the various entities may also be periodically re-certified at various intervals or when requirements in the checklist have changed, such as when a new bug or error has been found.

Figure 1:
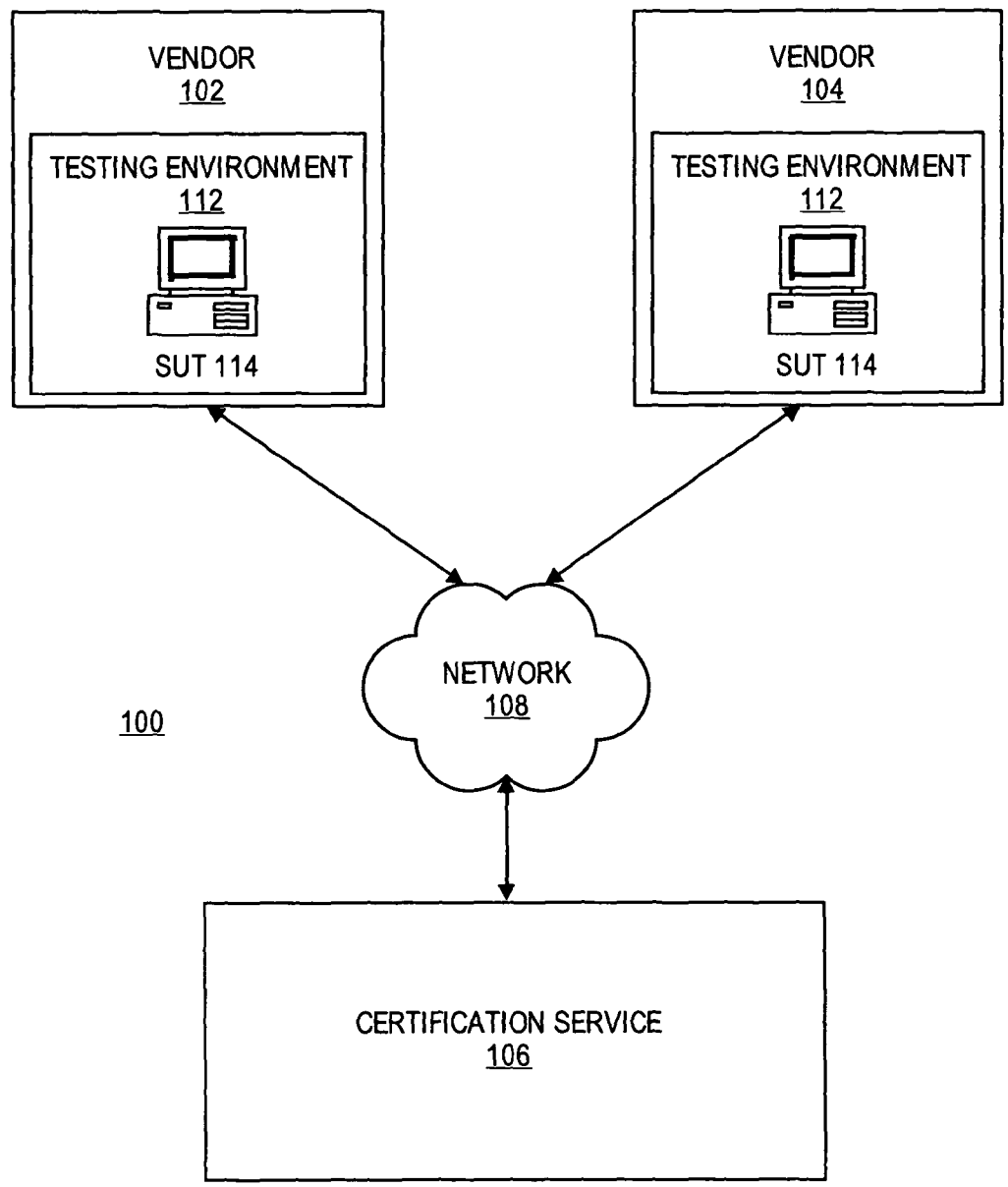
FIG. 1 shows an exemplary system for certifying components and program code.
Figure 2:
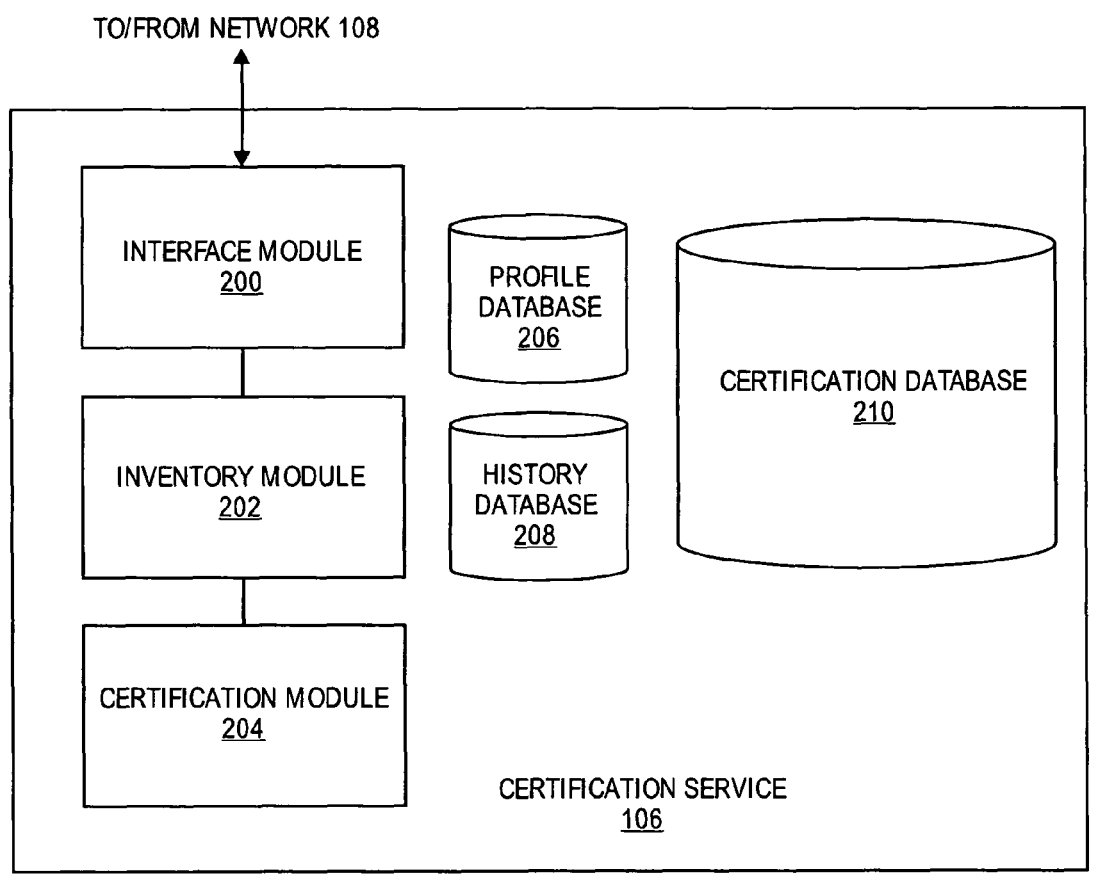
FIG. 2 shows an exemplary architecture for a certification service that may be part of the system shown in FIG. 1.
Figure 3:
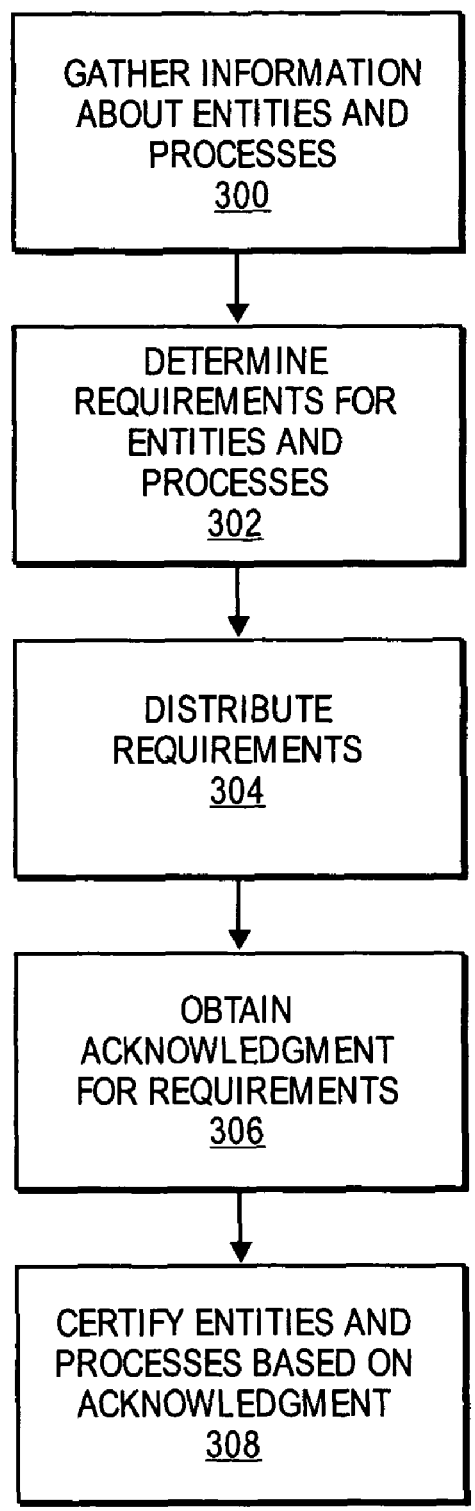
FIG. 3 shows a flowchart in which a component is certified based on a certification of the processes used to develop or test that component.

Reference will now be made in detail to embodiments of the invention, examples of which are illustrated in the accompanying drawings. For purposes of explanation, FIGS. 1-3 are described with reference to certifying a component from a vendor that is intended to work with one or more sets of installed program code. The component may be any form of hardware, firmware, or the like. The installed program code may generally refer to various types of software, such as the operating system, device drivers, and the like that are installed on a system. For example, the program code may be a particular operating system kernel (such as a LINUX kernel), BIOS, device driver, and the like. However, one skilled in the art will recognize that the certification processes of the present invention may be applied to confirm the compatibility of any combination of hardware or software that is desired.

FIGS. 1-2 illustrate generally the systems that may be used to certify components in accordance with the principles of the present invention. Specifically, FIG. 1 shows an exemplary system for certifying components and program code. FIG. 2 shows an exemplary architecture for a certification service that may be part of the system shown in FIG. 1. FIG. 3 illustrates an exemplary certification of entities and processes that are consistent with the principles of the present invention. Wherever possible, the same reference numbers will be used throughout the drawings to refer to the same or like parts.

FIG. 1 shows an embodiment of a system 100 for automatically certifying components in accordance with the principles of the present invention. As shown, system 100 may include a vendor 102, a testing organization 104, and a certification service 106. Although FIG. 1 depicts a single vendor, and testing organization embodiments of the present invention may accommodate any number of such entities.

The entities of system 100 may communicate with each other in a variety of ways. For example, as shown in FIG. 1, the entities of system 100 may be coupled through a network 108. Network 108 may be implemented using the Internet, or other network.

Alternatively, the entities of system 100 may communicate with each other indirectly. For example, vendor 102 and testing organization 104 may provide to and receive its information from certification service 106 in the form of a computer readable medium, such as a compact disc.

The specific entities of system 100 will now be further described. Vendor 102 may be any provider of hardware or software, such as an ISV or IHV that produces the component to be certified. Vendor 102 may also provide various other services related to its products, such as update information, technical support, and the like. Vendor 102 may provide these products and services directly or indirectly.

In some embodiments, vendor 102 may implement a testing environment 112 to perform development certification testing for its components. The steps and actions performed in testing environment 112 may generally be referred to as a "process" for development or testing. In particular, vendor 102 may implement testing environment 112 to test one or more of its components using a system-under-test ("SUT") 114. Although FIG. 1 shows vendor 102 with a single testing environment 112 and SUT 114, one skilled in the art will recognize that vendor 102 may operate any number of these systems. Exemplary implementations of testing environment 112 and SUT 114 will now be further described.

Testing environment 112 may comprise one or more servers and testing software. Such equipment and software are well known to those skilled in the art. This equipment controls and monitors the testing of SUT 114. In addition, the equipment of testing environment 112 may report the results of any testing back to certification service 106. In some embodiments, testing environment 112 is configured based on requirements provided by certification service 106. For example, the servers of testing environment 112 may be required to have a minimum processor speed, memory, operating system version, and the like. In addition, the servers of testing environment 112 may run a testing software application or testing kit that has been certified by certification service 106. In some embodiments, vendor 102 may register or establish an account with certification service 106 for testing environment 112 for authentication purposes. Of course, one skilled in the art will recognize that the configuration and requirements of testing environment 112 may vary based on the components and program code to be certified.

SUT 114 generally includes the component (from vendor 102) and the program code it is to be certified with. SUT 114 may include, for example, various central processing units, peripherals, storage devices, operating systems, software applications, basic input/output systems ("BIOS"), and device drivers. One skilled in the art may also refer to SUT 114 as equipment under test ("EUT"). In some embodiments, the configuration of SUT 114 may be determined based on requirements from certification service 106. For example, certification service 106 may provide vendor 102 various requirements in checklists regarding the minimum number and types of components and their respective certification level that is required for SUT 114. Typical requirements may relate to minimum or maximum amounts of memory, central processing unit types, chipsets, storage devices, peripherals, operating system kernel versions, device drivers, and the like. For example, a requirement in a checklist may be whether an "external storage devices needs to sustain a short cable pull without data loss." However, vendor 102 may be free to determine the specific configurations of SUT 114 to comply with the requirements in the checklists provided from certification service 106. Of course, one skilled in the art will recognize that the requirements in a checklist for SUT 114 may vary based on the components and program code that are to be certified. Different checklists may exist for different categories of hardware.

Alternatively, vendor 102 may have its certification testing performed by another entity, such as testing organization 104. For example, testing organization 104 may be an organization that specializes in testing for certification purposes. These organizations are well known to those skilled in the art. In some embodiments, testing organization 104 may be sponsored or authorized by the same organization that operates certification service 106. That is, testing organization 104 may have its testing processes certified by certification service 106. As noted, testing organization 104 may be free to determine its various implementations of test suites to comply with the checklists provided from certification service 106. As shown, testing organization 104 may also implement its own testing environment 112 and SUT 114 in the same manner described above. Of course, one skilled in the art will also recognize that vendor 102 and testing organization 104 may conduct certification testing alone or in combination with each other.

Certification service 106 provides an infrastructure and business logic for certifying components. In some embodiments, certification service 106 is implemented as a website or part of a website on the Internet. This website may provide various mechanisms for providing the checklist used to certify the development and testing processes used by vendor 102 or testing organization 104. In some embodiments, these checklists are transmitted at various intervals to vendor 102 or testing organization 104 or when changes have been made to the checklists. Alternatively, vendor 102 and testing organization 104 may explicitly request the checklists from certification service 106. Accordingly, certification service 106 may include any number of conventional servers (not shown). Such servers may be implemented with an Intel-based processor that executes an operating system, such as the Linux operating system. Furthermore, the servers of certification service 106 may support the TCP/IP communication for connecting to the other components of system 100, such as vendor 102, testing organization 104, or user system 106, over the Internet.

Of course, one skilled in the art will recognize that certification service 106 may include any amount of sufficient hardware to support a relatively large amount of certification information, such as testing results and operational data, and other operations. One example of an architecture for certification service 106 is shown with reference to FIG. 2.

Network 108 provides a communication infrastructure for system 100. Network 108 may be implemented based on known topologies and components. For example, network 108 may be implemented based on one or more local area networks, such as an Ethernet network, a wide area network, the Internet, or the like.

FIG. 2 shows an exemplary architecture for certification service 106 that is consistent with the principles of the present invention. In accordance with the present invention, the certification service 106 includes a number of executable components and database structures useful for certification. As shown, certification service 106 may include an interface module 200, an inventory module 202, and a certification module 204. These components may be implemented based on known components of hardware and software. For example, these components may be implemented as applications running on one or more conventional servers. In some embodiments, the servers of certification service 106 run applications and the Linux operating system. The functions of these exemplary components of certification service 106 will now be described.

Interface module 200 manages communications between certification service 106 and the other entities of system 100, such as vendor 102 and testing organization 104. For example, interface module 200 may be configured to periodically transmit certification checklists to vendor 102 and testing organization 104 for their processes on a regular basis and to request process information and configurations or configuration information that may include testing results or operational data for various systems. Of course, interface module 200 may also provide certification checklists upon requests from vendor 102 or testing organization 104.

The configuration information from vendor 102 or testing organization 104 may include a wide variety of data and may be in any format. For example, information from vendor 102 may be in the form of an XML file or a network location, such as a URL on the Internet. Alternatively, interface module 200 may be configured to obtain information about the processes used by vendor 102 or testing organization 104 by searching the Internet to identify who has released testing results or operational data recently. Software vendor interface module 200 may then download this information into history database 208, or store one or more network locations (URL) where the download can be obtained.

In addition, interface module 200 may provide one or more pages for authenticating the identity of vendor 102, testing organization 104, or user system 106, such as a user ID, password, digital certificates, and the like. This information may be manually entered by a user, or may automatically provided once a connection is established. Interface module 200 may be configured to collect other information, such as contact information, a mailing address, an email address, and payment information. Of course, interface module 200 may also provide instructions and a process for registering a new entity or enterprise that wishes to participate with certification service 106. In some embodiments, this information may be stored in and retrieved from profile database 206.

Inventory module 202 analyzes the configuration information and process information gathered from vendor 102, and testing organization 104 to identify the various hardware and software components and the program code that were tested as part of a system, such as SUT 114. For example, inventory module 202 may be programmed to identify the central processing unit and its architecture, the number of central processing units, the memory installed, the operating system kernel and its features, the device drivers installed, the BIOS installed, software applications installed, disk storage devices implemented, peripherals supported. In addition, inventory module 202 may also identify and track the various checklists used to certify the processes of vendor 102 and testing organization 104 and whether these entities have also provided an acknowledgement to comply with the checklists. Of course, other types of information may be identified by inventory module 202.

Certification module 204 then analyzes the information gathered from vendor 102 and testing organization 104 to determine whether a particular component or set of program code should be certified and to what extent they should be certified. For example, certification module 204 may be configured to certify a component or set of program code based on one or more rules or a set of pre-defined criteria. Some exemplary rules or criteria may include verifying that the various processes used by vendor 102 or testing service 104 have been certified or that they have complied with checklists provided from certification service 106. In some embodiments, certification service 106 may be configured to automatically certify components based on whether the processes used to develop or test that component have been certified. Of course, one skilled in the art will recognize that other rules or criteria may be used to certify components.

In addition, certification service 106 may include one or more embedded databases. For examples as shown, certification service 106 may include a profile database 206, a history database 208, and certification database 210. These databases may be implemented based on any known schema, for example, as a relational or object oriented database. Of course, one skilled in the art will recognize that certification service 106 may include or be coupled to other databases, such as a database that maintains information about the products from vendor 102, or information about user system 106. The exemplary databases shown in FIG. 2 will now be described.

Profile database 206 includes information related to authenticating a user or entity, such as vendor 102 or testing organization 104, and determining their respective rights to the configuration information gathered by certification service 106. For example, vendor 102 or testing organization 104 may be give access rights to their previous testing results and to the testing results of other entities under certain circumstances.

Other information that may be included in profile database 206 may comprise group and individual permissions of users belonging to vendor 102 or testing organization 104, authorized partners of these entities, and contact information.

History database 208 stores the information gathered from the entities of system 100. For example, history database 208 may include the various checklists for categories of hardware and when these checklists were sent. In addition, history database 208 may store the raw test result information generated by vendor 102 and testing organization 104, as well as operational data from user systems. Typical information the may be included in history database 208 may relate to a product description of SUT 114, driver files, information about the host bus adapter of SUT 114, the test suite and software used to test SUT 114, the program code that was installed on SUT 114, and information that identifies the respective vendors of hardware and software in SUT 114.

History database 208 may also include information that tracks errors and bugs in components that have been certified.

Certification database 210 provides a catalog of components that are certified and the checklists used to certify the processes for each component. For example, certification database 210 may provide information that indicates which components of hardware have been tested, the checklists used to certify the processes for developing or testing the components of hardware, and information that indicates the various sets of program code, such as operating system kernels, device drivers, BIOS, and the like.

One skilled in the art will recognize that certification database 210 may be configured to provide its information in a variety of formats. For example, certification database 210 may be configured to provide certification information that is sorted by vendor name, component name, component type, hardware platform type, central processing unit type, peripheral type, software platform type, software application, operating system version, BIOS version, date, and the like. An exemplary process for certifying components by certifying the entities or processes related to that component will now be described with reference to FIG. 3. Referring now to FIG. 3, in stage 300, certification service 106 gathers information from the other entities of system 100 via interface module 200. The information may relate to the configurations of any number of computer systems, such as SUT 114, and may indicate the entities and processes used by these entities to develop or test a component in SUT 114.

In stage 302, certification service 106 determines a set of requirements for certifying the entities and the processes used by these entities. For example, certification service 106 may develop a set of checklists and operational requirements based on the information provided from vendor 102 and testing organization 104. The set of requirements may also account for various errors or bugs that have been reported for a component. Different checklists may be provided for the various types of components in SUT 114 and their configurations. In addition, certification service 106 may be configured to compile the information gather from multiple entities and determine if any aspect of the processes used by the various entities overlap or in common with each other. In these instances, certification service 106 may leverage the efforts of these entities and use this as a basis of certifying other entities and processes.

In stage 304, certification service 106 distributes the set of requirements to the entities. For example, certification service 106 may distribute various checklists to vendor 102 and testing organization 104 at periodic intervals, such as daily or weekly, or when the checklists have been updated. Alternatively, certification service 106 may distribute checklists upon receiving a request from vendor 102 or testing organization 104.

In stage 306, certification service 106 may obtain acknowledgments to comply with the set of checklists from various entities. For example, when attempting to acknowledge a checklist from certification service 106, vendor 102 or testing organization 104 may access interface module 200. Vendor 102 or testing organization 104 may then be prompted for authentication information. Upon authentication, vendor 102 or testing organization 104 may access some or all of the information of certification service 106. Such rights may be determined based on the information in profile database 206 and enforced by interface module 200. These rights and restrictions may be specified when vendor 102 or testing organization 104 registers with certification service 106. One skilled in the art will recognize that the acknowledgement from vendor 102 and testing organization 104 may be formatted in various manners.

For example, in some embodiments, the acknowledgment may standardized based on requirements distributed by certification service 106. Certification service 106 may require that vendor 102 or testing organization 104 provide its acknowledgment and include a product description, names of driver files, information about the configuration of testing environment 112, the hardware platform of SUT 114, and the program code installed on SUT 114. Of course, other information may be required in the acknowledgment to certification service 106.

In stage 308, certification service 106 records the specific entities and processes in which acknowledgment was obtained and may then be configured to automatically certify components of hardware provided from these entities or certify components that have undergone processes that have been certified. That is, certification service 106 may certify various entities and processes and rely upon that certification to certify components produced or tested from those entities and processes.

For example, inventory module 202 may parse the gathered information and may record various information about the processes used in testing a component. In particular, inventory module 202 may identify the operating system kernel, the BIOS, the device drivers, and other software applications that were installed on SUT 114. Inventory module 202 may then update various fields in history database 208 and certification database 210 to indicate the processes which were used to test various components.

In addition, certification module 204 of certification service 106 may decide to certify an entity or process based on a set of rules or pre-determined criteria. In some embodiments, certification module 204 is configured to certify an entity or process only if it has acknowledged all the items in a checklist. Of course, one skilled in the art will recognize that the certification may be granted if the entity or process has acknowledged at least a minimum or threshold number of items in a checklist. In addition, certification module 204 may certify an entity or process at differing levels depending upon the acknowledgment. For example, certification module 204 may certify a testing process at a higher level if it has acknowledged a higher number of items in a checklist from certification service 106.

Once certification module 204 has certified an entity or process, certification service 106 may then take various actions to make this known. For example, certification service 106 may post a notice or bulletin on a website. Certification service 106 may also send a message or notice to vendor 102 or testing organization 104. In turn, these entities may then publicize this information on their respective websites. In addition, certification service 106 may issue a distinguishing logo or certificate that indicates an entity or its processes have been certified. One skilled in the art will recognize that certification module 204 may use a variety of known mechanisms to make a certification widely known. Alternatively, authorize vendor 102 or testing organization 104 may be authorized to issue a certification on behalf of certification service 106.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    providing to an entity, by a certification service that is executed by a server, a set of standards required for a test process that the entity uses to test a component of hardware;
    receiving, from the entity, acknowledgment that the test process for the component of hardware complies with the set of standards; and
    certifying that use of the complying test process to test the component of hardware will result in a certification of the component of hardware.

2. The method of claim 1, wherein the entity manufactured the component of hardware.

3. The method of claim 1, wherein receiving, from the entity, acknowledgment that the test process for the component of hardware complies with the set of standards comprises:
    providing a list of operational requirements to the entity; and
    receiving an indication that the entity will comply with the list of operational requirements.

4. The method of claim 1, wherein receiving, from the entity, acknowledgment that the test process for the component of hardware complies with the set of standards comprises:
    providing a list of test requirements to the identified entity; and
    receiving an indication that the entity will perform tests that obtain satisfactory results for the list of test requirements.

5. The method of claim 1, further comprising:
    testing the component of hardware using the complying test process; and
    certifying the tested component of hardware.

6. An apparatus comprising:
    a database configured to store a set of standards required for certification; and
    a processor configured to:
        provide, to an entity, the set of standards required for a test process that the entity uses to test a component of hardware;
        receive, from the entity, acknowledgment that the test process for the component of hardware complies with the set of standards; and
        certify that use of the complying test process to test the component of hardware will result in a certification of the component of hardware.

7. A method comprising:
    providing to an entity, by a certification service that is executed by a server, a checklist of requirements for testing a component of hardware;
    obtaining, from the entity, an acknowledgment that a test process for testing the component of hardware complies with the checklist; and
    certifying that use of the complying test process to test the component of hardware will result in a certification of the component of hardware.

8. The method of claim 7, wherein the providing of the checklist comprises:
    receiving from the entity a request for a checklist of requirements for testing the component of hardware;
    selecting a checklist from a plurality of checklists; and
    providing the selected checklist to the entity.

9. The method of claim 7, wherein the checklist indicates a requirement for a development process used by the entity to test the component of hardware.

10. The method of claim 7, wherein the checklist indicates a requirement for a testing process used by the entity to test the component of hardware.

11. The method of claim 7, wherein the providing of the checklist is performed at predetermined intervals.

12. The method of claim 7, further comprising:
    detecting a change in the checklist; and
    providing the updated checklist to the entity.

13. The method of claim 7, further comprising:
    receiving an indication of an error in operation of the component of hardware;
    updating the checklist when the checklist is affected by the error in operations; and
    providing the updated checklist to the entity.

14. The method of claim 7, wherein the complying test process is certified without further action from the entity.

15. The method of claim 7, further comprising:
    testing the component of hardware using the complying test process; and
    certifying the tested component of hardware.

16. A method comprising:
    receiving, by a certification service that is executed by a server, information that describes processes performed by entities to test a component of hardware;
    determining, by the certification service, a set of requirements for certification that are common to at least some of the processes performed by the entities;
    distributing the set of requirements to the entities;
    receiving, from the entities, acknowledgment that the at least some of the processes comply with the set of requirements; and
    certifying that use of the complying processes to test the component of hardware will result in a certification of the component of hardware.

17. The method of claim 16, wherein the information comprises a description of development processes performed by the entities.

18. The method of claim 16, wherein the information comprises a description of testing processes performed by the entities.

19. A non-transitory computer-readable storage medium, having instructions stored therein, which when executed, cause a computer system to perform a method comprising:
    providing to an entity a set of standards required for a test process that the entity uses to test a component of hardware;
    receiving, from the entity, acknowledgment that the test process for the component of hardware complies with the set of standards; and
    certifying that use of the complying test process to test the component of hardware will result in a certification of the component of hardware.

* * * * *